US012390899B2

(12) United States Patent
Numata

(10) Patent No.: US 12,390,899 B2
(45) Date of Patent: Aug. 19, 2025

(54) POWER TOOL

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 360 days.

(21) Appl. No.: 18/093,543

(22) Filed: Jan. 5, 2023

(65) Prior Publication Data

US 2023/0278157 A1 Sep. 7, 2023

(30) Foreign Application Priority Data

Mar. 3, 2022 (JP) ................................ 2022-032895

(51) Int. Cl.
*B24B 23/02* (2006.01)
*B24B 55/10* (2006.01)
*B25F 5/00* (2006.01)
*B25F 5/02* (2006.01)

(52) U.S. Cl.
CPC ............ *B24B 23/022* (2013.01); *B25F 5/005* (2013.01); *B25F 5/008* (2013.01); *B25F 5/02* (2013.01); *B24B 55/102* (2013.01)

(58) Field of Classification Search
CPC ..... B24B 23/028; B24B 23/022; B24B 23/02; B24B 23/04; B24B 55/10; B24B 455/102; B24B 455/02; B24B 55/052; B24B 45/003; B24B 45/006; B25F 5/008; B25F 5/02
USPC ........................................ 451/359, 449, 541
See application file for complete search history.

(56) References Cited

U.S. PATENT DOCUMENTS

| | | | | |
|---|---|---|---|---|
| 7,438,634 B2 * | 10/2008 | Habele | ...................... | B27B 5/32 451/353 |
| 7,988,538 B2 * | 8/2011 | Trautner | .................. | H02K 9/06 451/344 |
| 8,858,301 B2 * | 10/2014 | Reid | ......................... | B27B 5/30 451/356 |
| 2016/0193727 A1 * | 7/2016 | Takeda | .................... | B25F 5/008 173/46 |
| 2019/0344461 A1 * | 11/2019 | Kamiya | .................. | B26B 25/00 |
| 2020/0384597 A1 | 12/2020 | Numata | | |

FOREIGN PATENT DOCUMENTS

| | | | | |
|---|---|---|---|---|
| JP | 2020-199627 A | 12/2020 | | |
| KR | 200487071 Y1 * | 8/2018 | ............. | B24B 23/02 |

OTHER PUBLICATIONS

Machine translation of KR-200487071-Y1 (Year: 2018).*

* cited by examiner

*Primary Examiner* — Robert F Neibaur
(74) *Attorney, Agent, or Firm* — Oliff PLC

(57) ABSTRACT

A grinder includes a locking assembly to lock a spindle in a head housing and has outlets with a large opening area for high cooling efficiency. A grinder includes a main housing accommodating a motor and a fan, a spindle, a locking assembly that locks rotation of the spindle, and a head housing including a joint connected to a front of the main housing, and a compartment accommodating the spindle and the locking assembly. The compartment is laterally less wide than the joint. The locking assembly is located at a middle in a lateral direction of the head housing. The joint has, in a portion of a front surface of the joint, a first outlet at least on a right or a left of the compartment to discharge air for cooling the motor generated from rotation of the fan.

20 Claims, 8 Drawing Sheets

POWER TOOL

CROSS-REFERENCE TO RELATED APPLICATIONS

This application claims the benefit of priority to Japanese Patent Application No. 2022-032895, filed on Mar. 3, 2022, the entire contents of which are hereby incorporated by reference.

BACKGROUND

1. Technical Field

The present disclosure relates to a power tool such as a grinder including a motor as a power supply.

2. Description of the Background

A grinder includes, for example, a spindle that rotates when driven by a motor. The spindle protruding downward from a housing receives a tip tool such as a grinding disc at its distal end. The grinder can perform an operation such as grinding with the tip tool rotating together with the spindle.

When the tip tool is to be attached to or detached from the grinder, the spindle is locked not to rotate. For example, Japanese Unexamined Patent Application Publication No. 2020-199627 (hereafter, Patent Literature 1) describes a grinder including a gear housing (head housing) accommodating a spindle and bevel gears in front of a main housing accommodating a motor. The gear housing includes a shaft lock (locking assembly). The shaft lock is pressed into the gear housing to have its distal end engaging with recesses in the bevel gears integral with the spindle. This locks the spindle not to rotate.

BRIEF SUMMARY

In Patent Literature 1, the shaft lock is located rightward in the gear housing. A compartment accommodating the spindle and the bevel gears is thus laterally wider to have substantially the same lateral width as its joint to the main housing. In the structure including a fan to cool the motor in the main housing, the gear housing can have outlets for discharging air for cooling the motor above and below the compartment alone. This structure cannot easily increase the opening area of the outlets to cool the motor efficiently.

One or more aspects of the present disclosure are directed to a power tool including a locking assembly to lock a spindle in a head housing and having outlets with a large opening area for high cooling efficiency.

A first aspect of the present disclosure provides a power tool, including:

- a motor;
- a fan configured to cool the motor;
- a main housing accommodating the motor and the fan;
- a spindle to which a tip tool is detachably attachable;
- a locking assembly configured to lock rotation of the spindle; and
  - a head housing including
  - a joint connected to a front of the main housing, and a compartment accommodating the spindle and the locking assembly, the compartment being laterally less wide than the joint,
- wherein the locking assembly is located at a middle in a lateral direction of the head housing, and

- the joint has, in a portion of a front surface of the joint, a first outlet at least on a right or a left of the compartment to discharge air for cooling the motor generated from rotation of the fan.

The power tool according to the above aspect of the present disclosure includes the locking assembly to lock the spindle in the head housing and has the outlets with a large opening area for high cooling efficiency.

DETAILED DESCRIPTION

Embodiments of the present disclosure will now be described with reference to the drawings.

Figure 1:
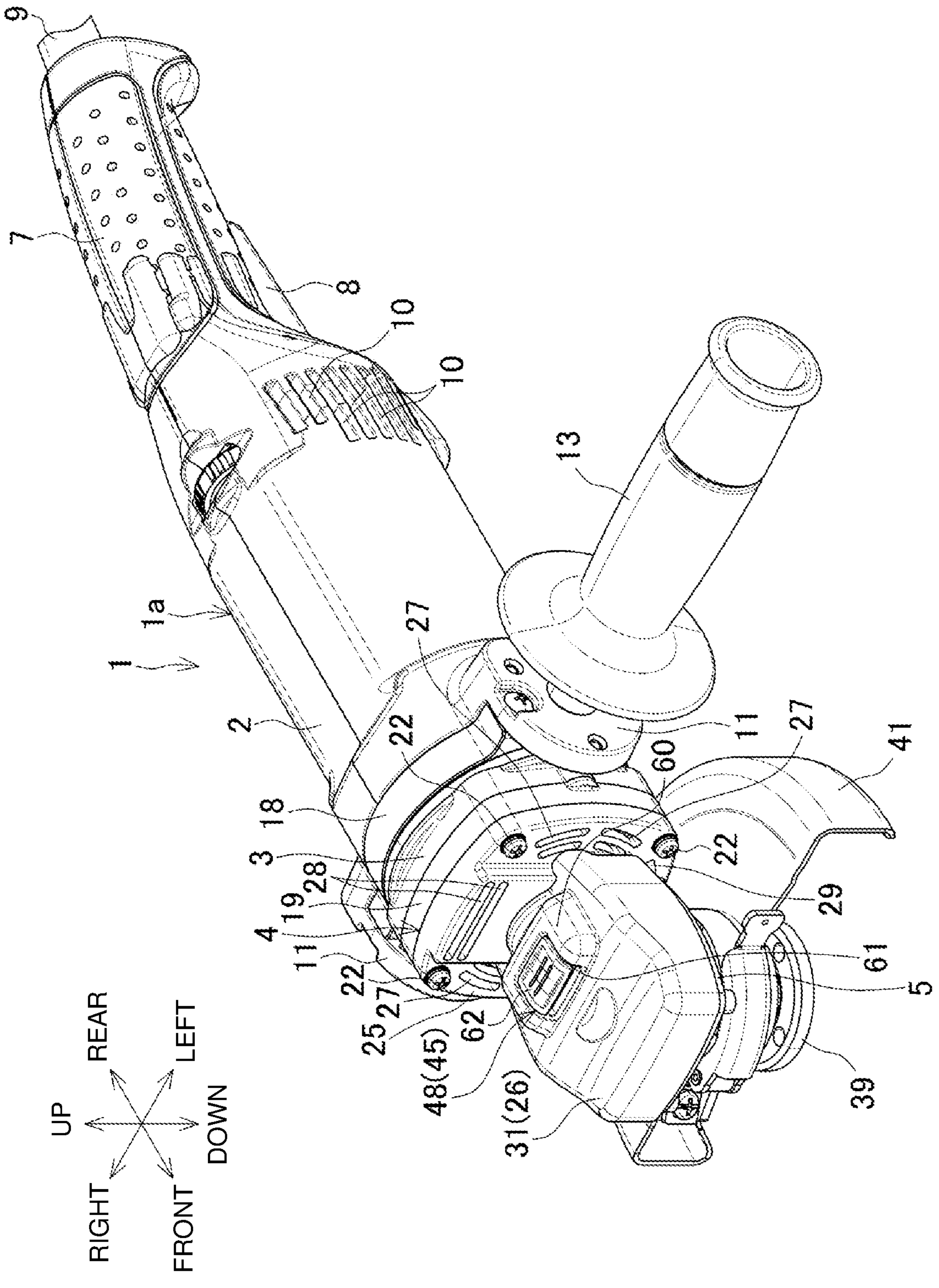
FIG. 1 is a perspective view of a grinder.
Figure 2:
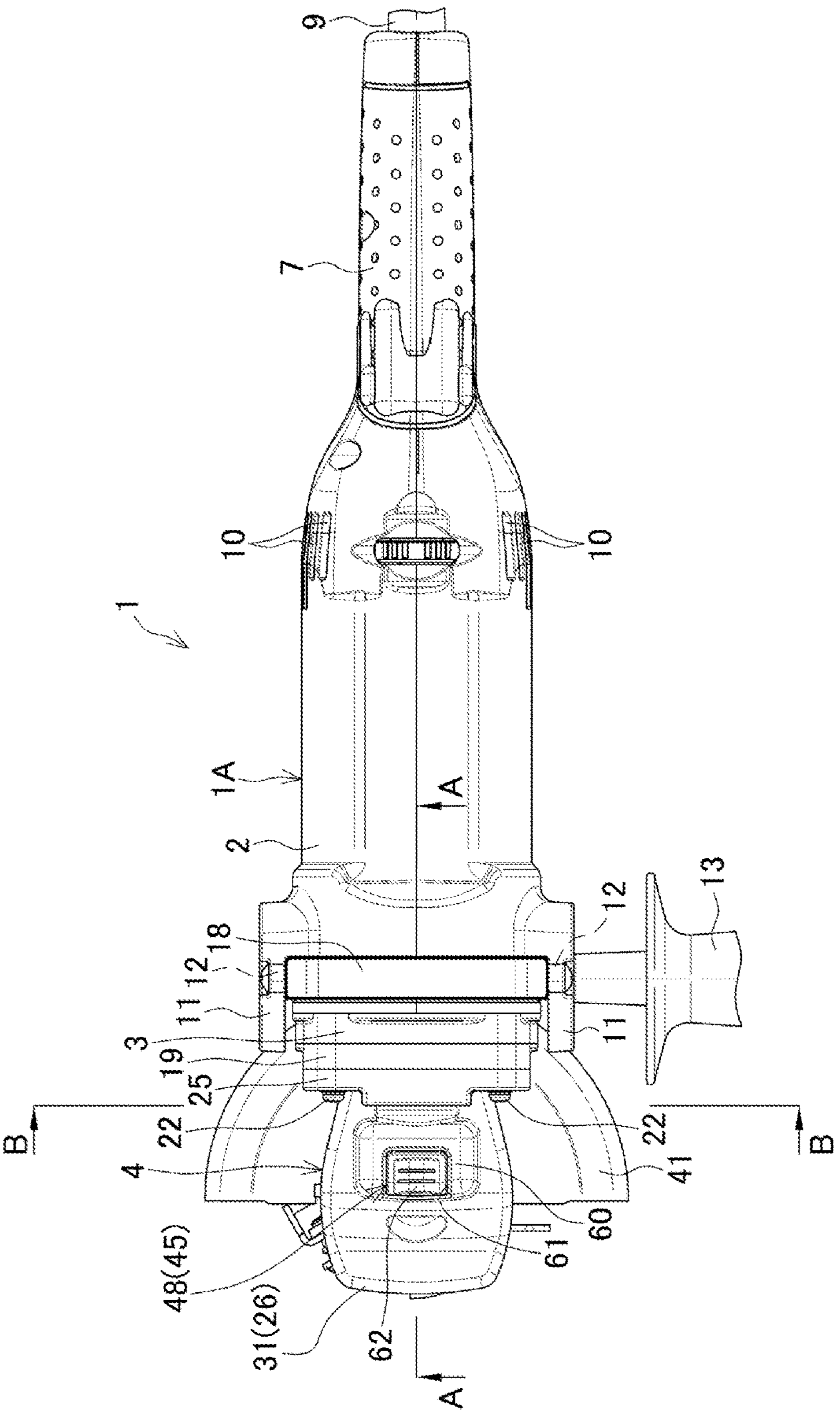
FIG. 2 is a plan view of the grinder.
Figure 3:
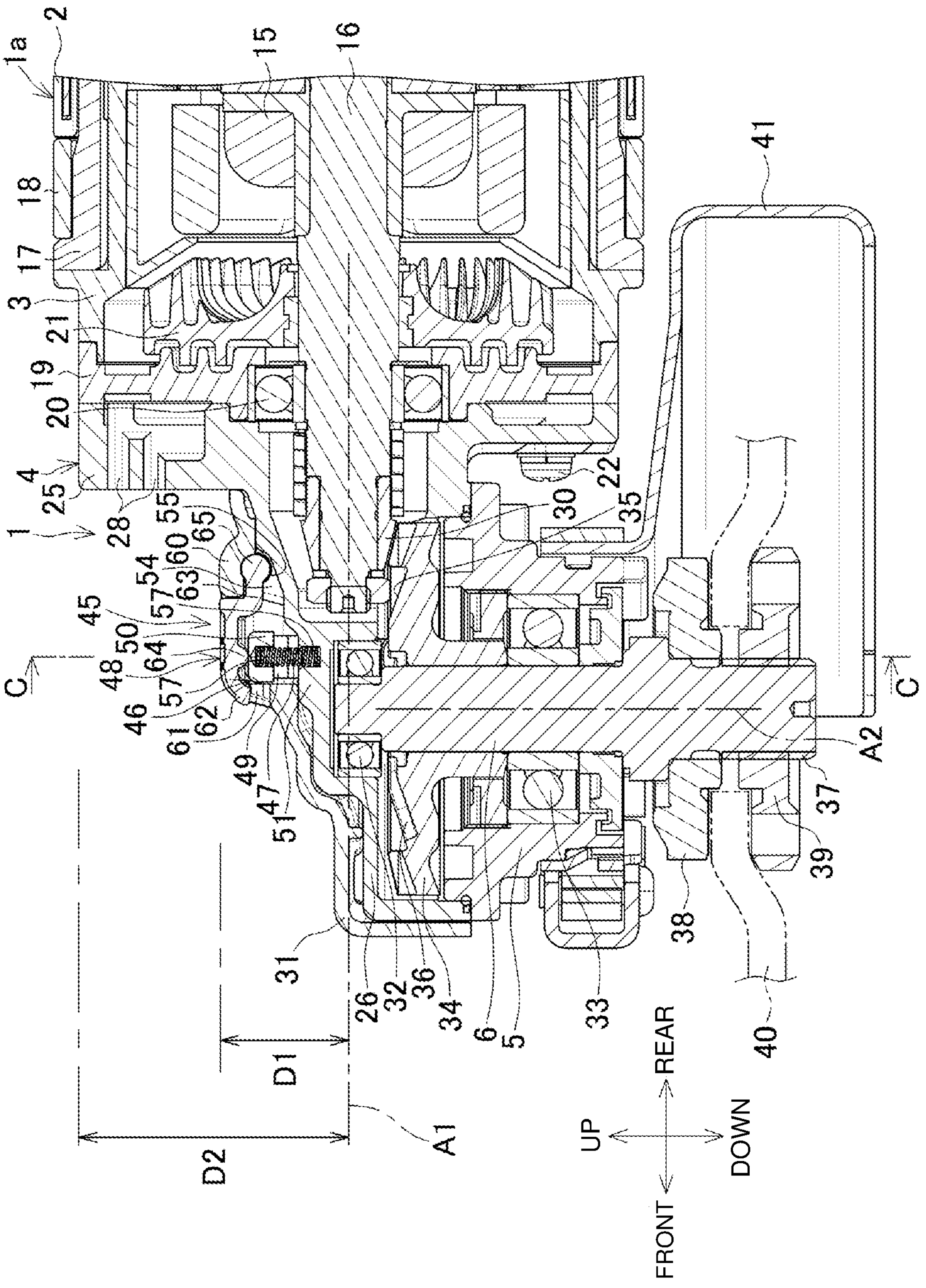
FIG. 3 is an enlarged sectional view taken along line A-A in FIG. 2 with a locking member at a non-engagement position.

FIG. 1 is a perspective view of a grinder as an example of a power tool. FIG. 2 is a plan view of the grinder. FIG. 3 is an enlarged sectional view taken along line A-A in FIG. 2.

A grinder 1 includes a main housing 1*a* including an outer housing 2 and an inner housing 3. The outer housing 2 and the inner housing 3 are formed from resin. A metal gear housing 4 is connected to the front of the main housing 1*a*. The gear housing 4 is an example of head housing. The gear housing 4 receives a bearing retainer 5 attached to its lower portion. A spindle 6 protrudes downward from the bearing retainer 5.

Figure 6:
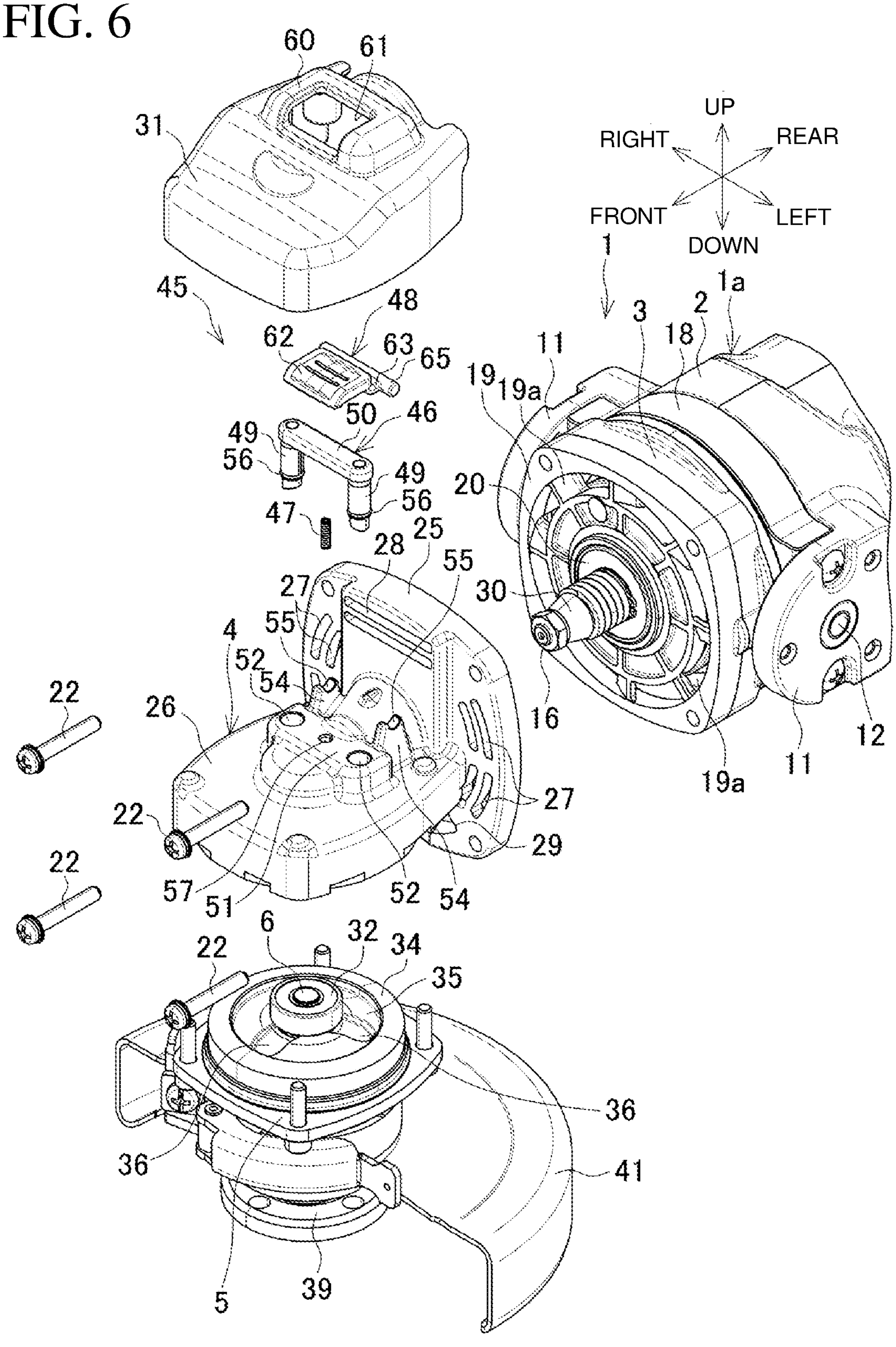
FIG. 6 is an exploded perspective view of a gear housing and a locking assembly.

The outer housing 2 is a cylinder extending in the front-rear direction. The outer housing 2 includes, in its rear portion, a grip 7 with a smaller diameter. The grip 7 includes a switch lever 8. The grip 7 has its rear end connected to a power cable 9. The outer housing 2 has multiple inlets 10 in the right and left side surfaces of its larger diameter portion. The outer housing 2 has handle mounts 11 attached to the right and left side surfaces at its front end. The handle mounts 11 are plates extending laterally outward from the front end of the outer housing 2, and then protruding frontward. The handle mounts 11 each have a threaded hole 12 (FIGS. 2 and 6). A side handle 13 is screwed into the threaded hole 12.

The inner housing 3 accommodates a motor 15. The motor 15 is held with an output shaft 16 extending in the front-rear direction. A rubber cylinder 17 is externally mounted on the outer circumference of the inner housing 3. The outer housing 2 holds the inner housing 3 with the rubber cylinder 17 between them. A metal fixing ring 18 is externally mounted on the rubber cylinder 17. The handle mounts 11 are fastened to the fixing ring 18 with screws.

A partition 19 is located between the inner housing 3 and the gear housing 4. The output shaft 16 extends through the partition 19 into the gear housing 4. The partition 19 includes a bearing 20 supporting the output shaft 16. The output shaft 16 receives a fan 21 behind the partition 19.

The gear housing 4 includes a joint 25 and a gear compartment 26 that are integral with each other. The joint 25 is rectangular as viewed from the front. The joint 25 has its corners fastened, together with the partition 19, to the inner housing 3 with four screws 22 from the front.

The gear compartment 26 protrudes frontward from the middle in the vertical and lateral directions of the joint 25. The gear compartment 26 is rectangular as viewed in plan and has an opening in its lower surface. The gear compartment 26 is laterally less wide than the joint 25.

Figure 4:
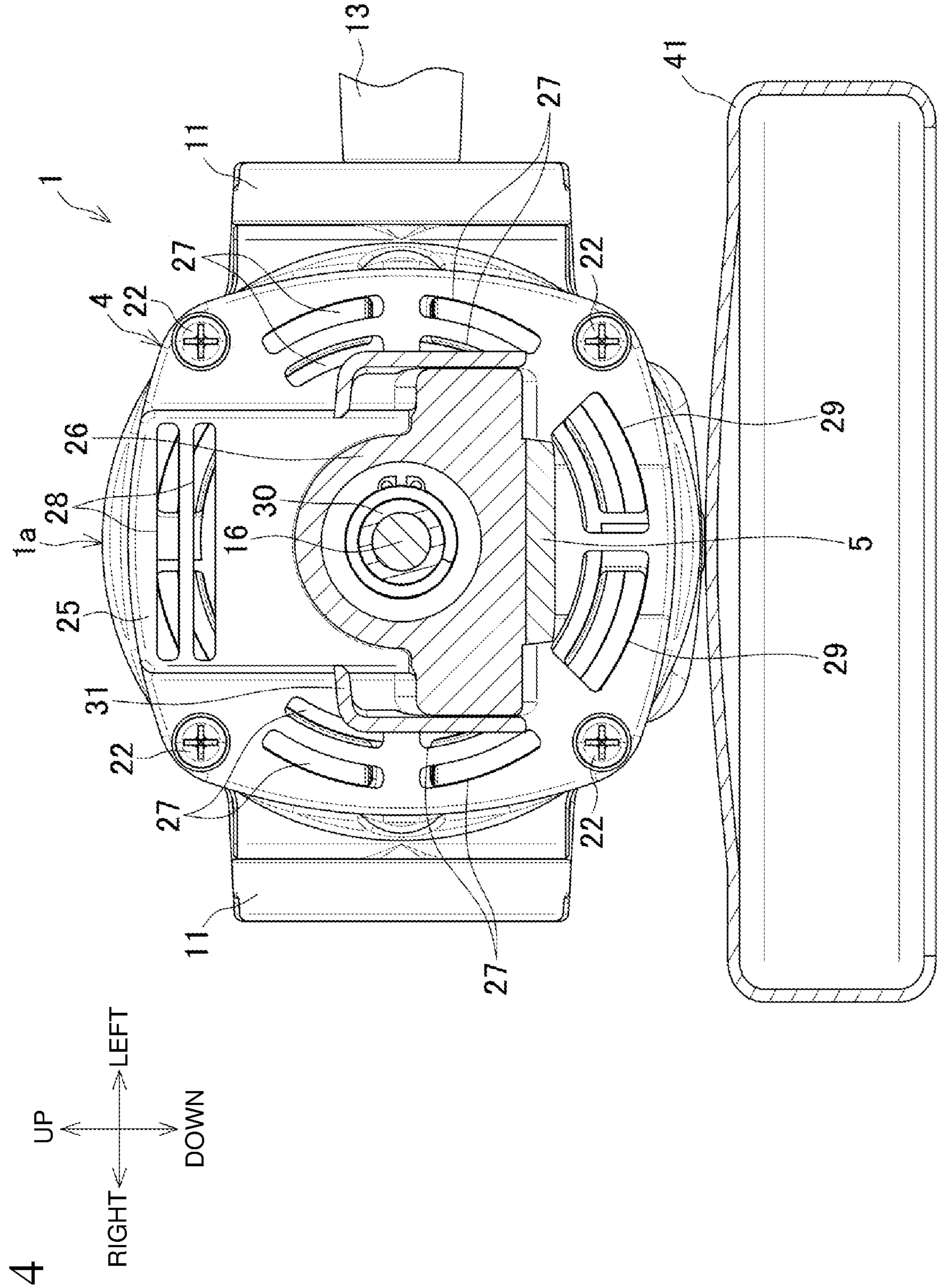
FIG. 4 is an enlarged sectional view taken along line B-B in FIG. 2.

As shown in FIG. 4, the joint 25 has, in portions of the front surface, multiple lateral outlets 27 on the right and left of the gear compartment 26. Each lateral outlet 27 is arc-shaped. The multiple lateral outlets 27 are laterally symmetrical to one another. The joint 25 has multiple upper outlets 28 in its front surface above the gear compartment 26. Each upper outlet 28 is elongated in the lateral direction. The joint 25 has multiple lower outlets 29 in its front surface below the gear compartment 26. Each lower outlet 29 is arc-shaped. In other words, the outlets 27, 28, and 29 surround the basal end of the gear compartment 26 as viewed from the front.

The output shaft 16 extends through the joint 25 into the gear compartment 26. A first bevel gear 30 is fixed to the front end of the output shaft 16 in the gear compartment 26. The bearing retainer 5 is a cylinder with its upper end having the same shape as the gear compartment 26 as viewed in plan. The bearing retainer 5 is fastened to a lower portion of the gear compartment 26 with screws from below. A front cover 31 is placed on the gear compartment 26 from above. The front cover 31 is formed from resin. The front cover 31 covers the upper surface, the front surface, and the right and left side surfaces of the gear compartment 26. The front cover 31 is held between the gear compartment 26 and the bearing retainer 5.

As shown in FIG. 3, a distance D1 in the vertical direction from an axis A1 of the output shaft 16 to the upper end of the gear compartment 26 including the front cover 31 is less than the half of a distance D2 in the vertical direction from the axis A1 to the upper end of the joint 25. The gear compartment 26 including the front cover 31 has smaller dimensions than the joint 25 in the vertical and lateral directions.

Figure 5:
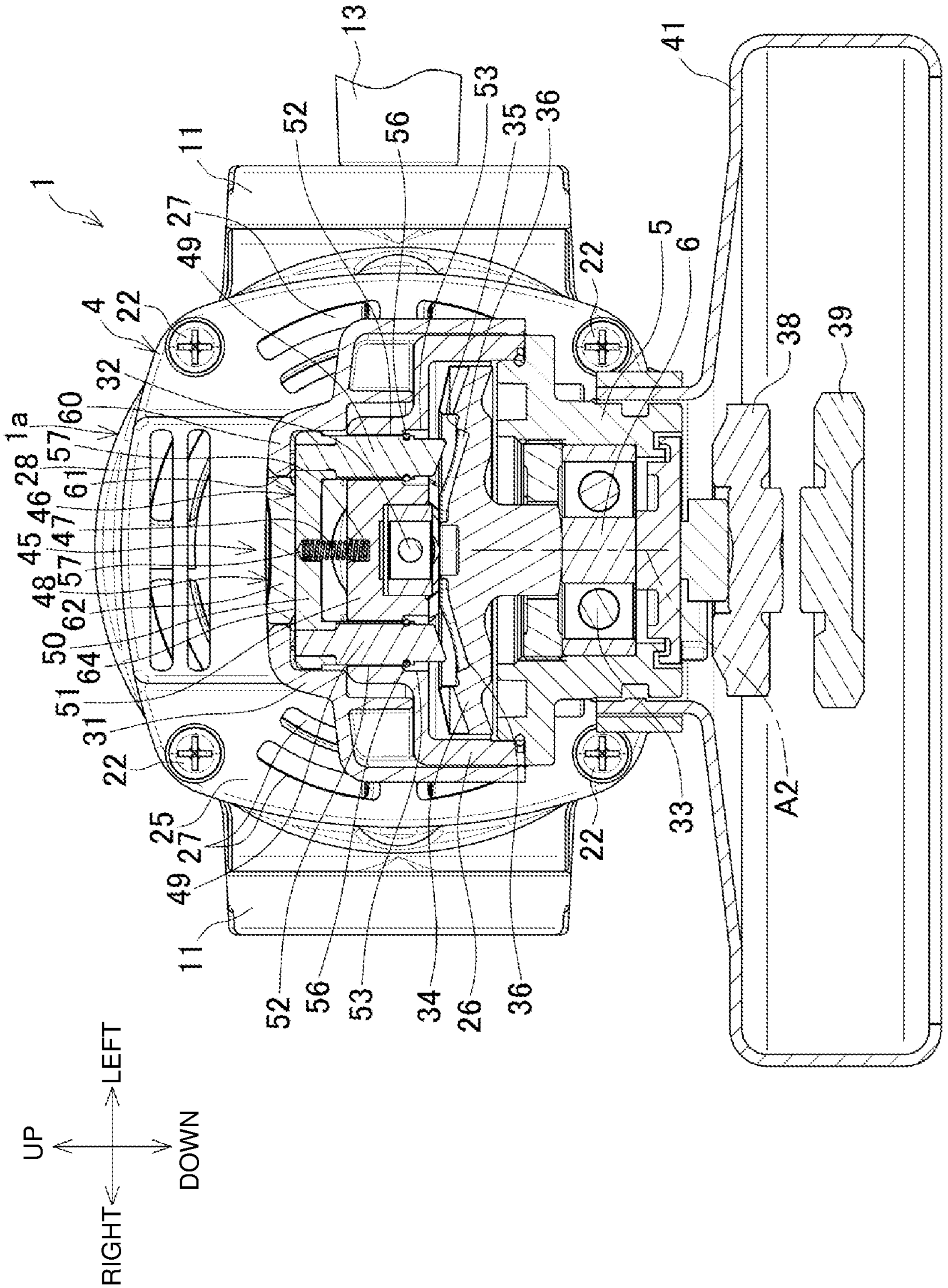
FIG. 5 is a sectional view taken along line C-C in FIG. 3.

The spindle 6 extends in the vertical direction through the gear compartment 26 and the bearing retainer 5. The spindle 6 has its upper end supported by the bearing 32 held on the gear compartment 26. The spindle 6 has its intermediate portion supported by the bearing 33 held on the bearing retainer 5. A second bevel gear 34 is fixed to the spindle 6 above the bearing 33. The second bevel gear 34 meshes with the first bevel gear 30. The second bevel gear 34 has its upper surface, except teeth on the outer circumference, defining a conical surface 35 that gradually rises toward the center. As shown in FIGS. 5 and 6, the conical surface 35 has three recesses 36. Each recess 36 extends radially outward from the spindle 6 at the center. The three recesses 36 are located at equal intervals in the circumferential direction of the second bevel gear 34.

The spindle 6 has its lower end extending through the bearing retainer 5 downward. The spindle 6 includes a threaded portion 37 on its lower end. An inner flange 38 is externally mounted on the spindle 6 above the threaded portion 37. An outer flange 39 is screwed to the threaded portion 37 below the inner flange 38. With a tip tool 40 (e.g., a grinding disc) held between the inner flange 38 and the outer flange 39, the outer flange 39 is tightened. This fixes the tip tool 40 to the spindle 6. The bearing retainer 5 receives a wheel cover 41 that covers the rear upper surface and the rear circumferential surface of the tip tool 40.

The gear compartment 26 and the front cover 31 include a locking assembly 45. The locking assembly 45 can restrict the rotation of the spindle 6. The locking assembly 45 includes a locking member 46, a coil spring 47, and an operation button 48.

The locking member 46 includes two engagement pins 49 and a connector 50. The engagement pins 49 are located laterally symmetrical about an axis A2 of the spindle 6 as viewed from the front. Each pin 49 is a rod extending in the vertical direction. The connector 50 is a rod extending in the lateral direction. The engagement pins 49 have their upper ends pressed onto and connected to the right and left ends of the connector 50. The locking member 46 thus forms an inverted U shape as viewed from the front.

A receiver 51 is raised from the upper surface of the gear compartment 26 behind the axis A2 of the spindle 6. The receiver 51 has its upper surface on a plane defined in the front-rear and lateral directions. The receiver 51 is rectangular as viewed in plan. The receiver 51 extends in the lateral direction to cover the bearing 32. The receiver 51 has a pair of right and left through-holes 52. Each through-hole 52 extends in the vertical direction. Each through-hole 52 has its lower portion with a larger diameter than its upper portion to define a larger-diameter hole 53. Each through-hole 52 is open into the internal space of the gear compartment 26.

A pair of right and left reception plates 54 are located behind the receiver 51. Each reception plate 54 extends in the front-rear direction on the upper surface of the gear compartment 26. Each reception plate 54 extends upward. Each reception plate 54 has a semicircular cutout 55 on its upper end.

The right and left engagement pins 49 extend through the through-holes 52 into the gear compartment 26. The engagement pins 49 and the radially outward ends of the recesses 36 on the second bevel gear 34 are located concentrically as viewed in plan. Each engagement pin 49 has its lower end cut diagonally in conformance with the shape of the conical surface 35 of the second bevel gear 34. An O-ring 56 is externally mounted on a lower portion of each engagement pin 49. The O-ring 56 is located inside the larger-diameter hole 53.

The connector 50 has a blind hole 57 at the middle in the lateral direction of its lower surface. The receiver 51 has a blind hole 57 at the middle in the lateral direction of its upper surface. The blind holes 57 have openings facing each other in the vertical direction. The coil spring 47 has its ends placed in the upper and lower blind holes 57 and are supported in the vertical direction, urging the locking member 46 upward.

The front cover 31 includes, at the middle in the lateral direction of its rear portion, a frame 60 raised upward. The frame 60 is a rectangle elongated in the lateral direction as viewed in plan. The frame 60 defines a space allowing the connector 50 to move vertically between the receiver 51 and the frame 60. The frame 60 includes an operation window 61 opening outward except the right, left, and rear portions of the frame 60.

The operation button 48 is located below the frame 60. The operation button 48 includes a front button portion 62 and a rear support 63 that are integral with each other. The button portion 62 is rectangular as viewed in plan. The button portion 62 has dimensions to be fitted in the operation window 61 in the frame 60. The button portion 62 has its front portion sloped downward toward the front. A pressing portion 64 protrudes downward from the lower surface of the button portion 62. The pressing portion 64 extends in the lateral direction.

The support 63 is connected to the rear end of the button portion 62. The support 63 extends downward and then bends rearward to be L-shaped as viewed laterally. The support 63 has its rear end integral with a supporting rod 65 extending in the lateral direction.

Attaching the operation button 48 will now be described. The locking member 46 is first attached to the gear compartment 26 together with the coil spring 47. The supporting rod 65 in the support 63 is then placed on the cutouts 55 on the reception plates 54 in the gear compartment 26. With the front cover 31 placed in this state, the supporting rod 65 is held between the reception plates 54 and the front cover 31 as shown in FIG. 3. The operation button 48 is thus supported in a manner swingable in the vertical direction about the supporting rod 65.

The connector 50 in the locking member 46, which is urged upward by the coil spring 47, comes in contact with the pressing portion 64 of the button portion 62 from below. The operation button 48 is thus urged to an upper swing position in FIG. 3 in a normal state. At the upper swing position, the support 63 is in contact with the frame 60 behind the operation window 61. At the upper swing position, the button portion 62 is located in an upper portion of the operation window 61.

In this state as shown in FIG. 5, the locking member 46 is at an uppermost position at which the O-rings 56 on the engagement pins 49 are at the upper ends of the larger-diameter holes 53 of the through-holes 52. At the uppermost position, the engagement pins 49 have their lower ends located above the recesses 36 on the second bevel gear 34 to be at non-engagement positions at which the engagement pins 49 are not engaged with the recesses 36 in the rotation direction.

Figure 7:
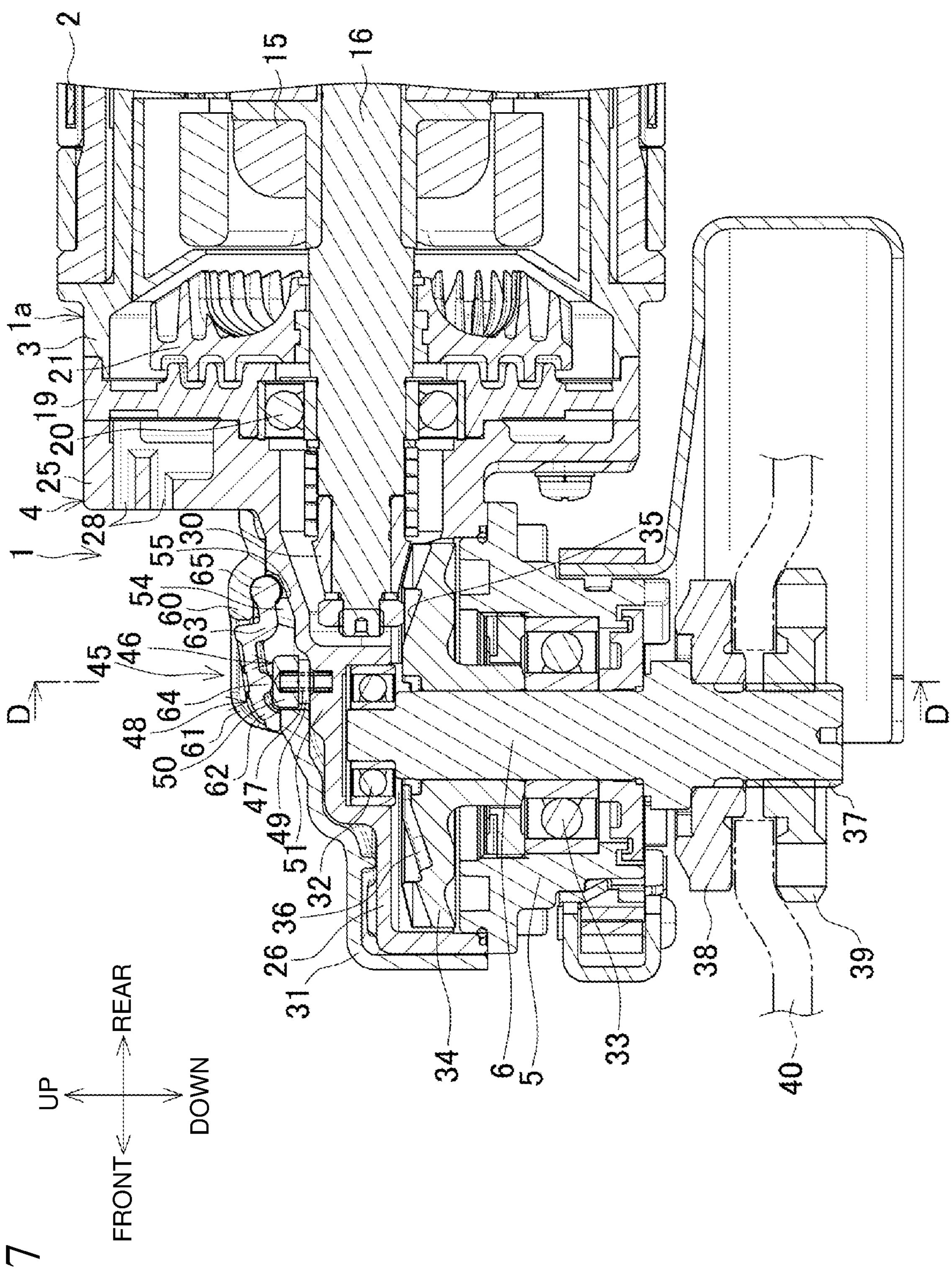
FIG. 7 is an enlarged sectional view corresponding to FIG. 3 with the locking member at an engagement position.
Figure 8:
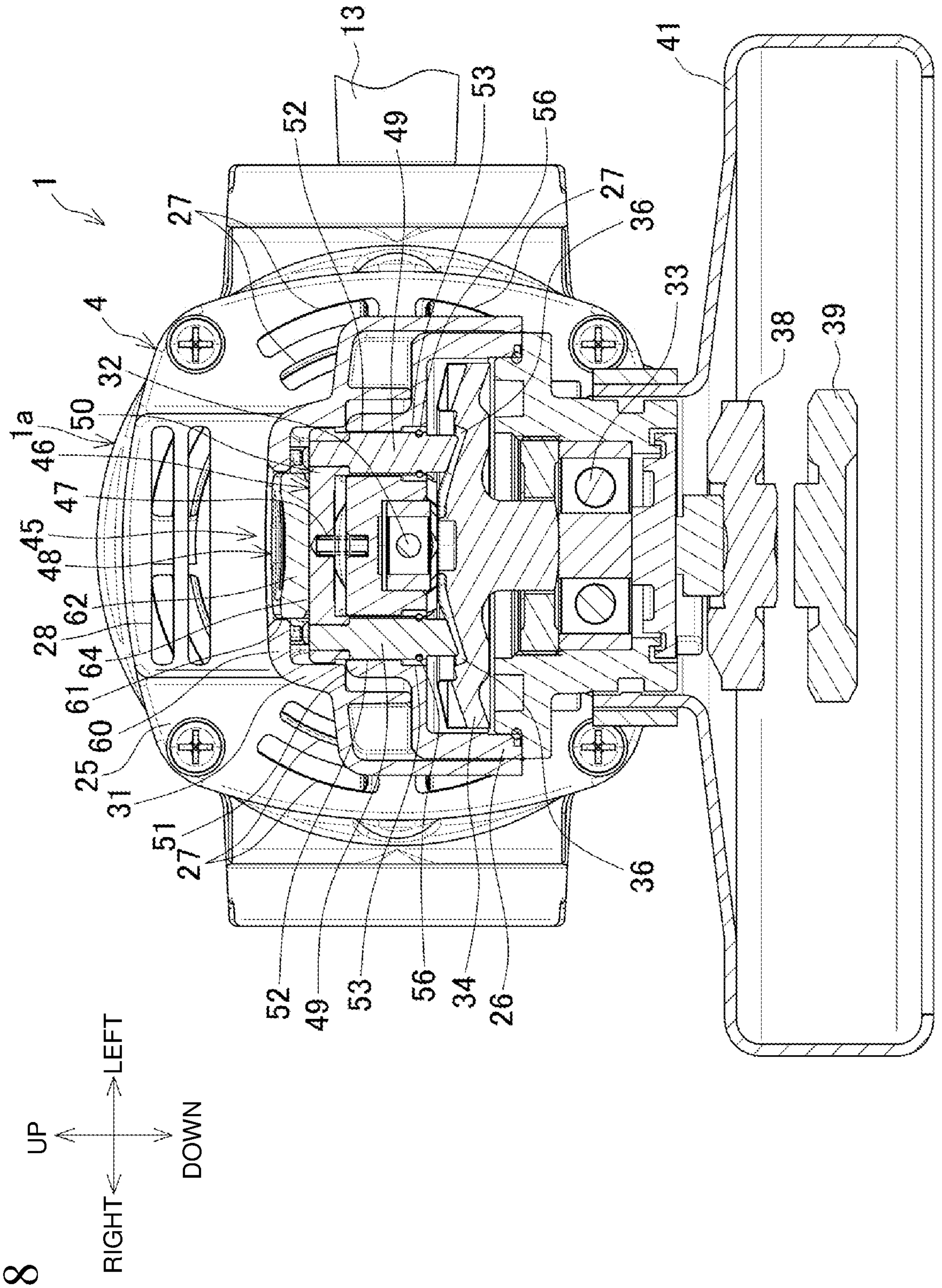
FIG. 8 is a sectional view taken along line D-D in FIG. 7.

The button portion 62 in the operation button 48 is depressed from the upper swing position. As shown in FIG. 7, the operation button 48 is then swung downward about the supporting rod 65 to be at a lower swing position at which the button portion 62 has its front end in contact with the upper surface of the front cover 31. With the connector 50 thus pressed downward by the pressing portion 64, the locking member 46 moves to a lowermost position against an urging force from the coil spring 47. At the lowermost position as shown in FIG. 8, the lower ends of the engagement pins 49 are received in the two recesses 36 on the second bevel gear 34 to be at engagement positions at which the engagement pins 49 are engageable with the recesses 36 in the rotation direction.

The switch lever 8 is depressed to turn on a switch (not shown) in the grip 7. The motor 15 is thus driven to rotate the output shaft 16. The rotation of the output shaft 16 is transmitted from the first bevel gear 30 to the second bevel gear 34, and then to the spindle 6. This rotates the tip tool 40 to, for example, grind a workpiece.

In the gear housing 4 in this state, the locking assembly 45 is located between the axis A2 of the spindle 6 and the joint 25, and the distance D1 is less than the half of the distance D2. This structure reduces the height of the gear compartment 26. The gear compartment 26 and the front cover 31 are thus less likely to obstruct an operator's view. This structure also facilitates operations performed in small spaces.

The fan 21 rotates as the output shaft 16 rotates. This causes outside air to be drawn through the rear inlets 10. The air flows forward in the inner housing 3 and passes through the motor 15. The air flows along the outer periphery of the fan 21 into multiple through-holes 19*a* (FIG. 6) in the partition 19, and then is discharged forward through the outlets 27, 28, and 29 in the joint 25. This cooling air cools the motor 15. The outlets 27, 28, and 29 in the joint 25 increase the opening area. This structure allows a larger amount of air to flow in the inner housing 3 and thus cools the motor 15 more effectively.

To detach the tip tool 40 for, for example, replacement after the operation is complete, the button portion 62 in the operation button 48 is depressed. The operation button 48 then swings about the supporting rod 65 to the lower swing position in FIGS. 7 and 8. This causes the locking member 46 to move to the lowermost position against the urging force from the coil spring 47. In this state, the button portion 62 swings at a position frontward from the supporting rod 65. The button portion 62 can thus be depressed with a small force against the urging force from the coil spring 47. The laterally symmetrical engagement pins 49 receive a pressing force from the button portion 62 in a well-balanced manner through the connector 50. The engagement pins 49 thus smoothly move downward without tilting.

Upon the locking member 46 reaching the lowermost position, the lower ends of the engagement pins 49 engage with the two recesses 36 on the second bevel gear 34. The locking member 46 thus restricts the rotation of the second bevel gear 34. With the outer flange 39 loosened using a tool in this state, the tip tool 40 can be replaced.

The two engagement pins 49 in the locking member 46 are engaged with the two recesses 36. When the outer flange 39 is loosened or tightened, stress in the locking member 46 is thus distributed. In particular, the engagement pins 49 located laterally symmetrical to each other allow uniform distribution of the stress.

This structure improves the strength and the durability of the locking assembly 45. This structure can also reliably lock the spindle 6 not to rotate. The structure includes the two engagement pins 49, but includes the single operation button 48, and thus does not to lower the operability.

When the locking member 46 moves downward, the lower ends of the engagement pins 49 may not align with the recesses 36 and may be in contact with the conical surface 35 of the second bevel gear 34. In this case, the tip tool 40 may be rotated to rotate the second bevel gear 34. This changes the positions of the recesses 36 to allow the lower ends of the engagement pins 49 to align with the recesses 36.

In response to the button portion 62 being released from depressing upon completion of, for example, replacement of the tip tool 40, the locking member 46 returns to the uppermost position in FIGS. 3 and 5 under the urging force from the coil spring 47. This separates the engagement pins 49 from the recesses 36. The operation button 48 is also simultaneously pressed by the connector 50 from below to return to the upper swing position.

The grinder 1 according to the present embodiment includes the motor 15, the fan 21 that cools the motor 15, the main housing 1*a* accommodating the motor 15 and the fan 21, the spindle 6 to which the tip tool 40 is detachably attachable, the locking assembly 45 that locks the rotation of the spindle 6, and the gear housing 4 connected to the front of the main housing 1*a* and accommodating the spindle 6 and the locking assembly 45. The gear housing 4 includes the joint 25 connected to the main housing 1*a*, and the gear compartment 26 (compartment) accommodating the spindle 6 and the locking assembly 45.

The gear compartment 26 is laterally less wide than the joint 25. The locking assembly 45 is located at the middle in the lateral direction of the gear housing 4. The joint 25 has, in the portions of the front surface of the joint 25, the lateral outlets 27 (first outlet) on the right and the left of the compartment 26 to discharge air for cooling the motor 15 generated from the rotation of the fan 21.

This structure can increase the opening area of the lateral outlets 27 and can improve cooling efficiency although the gear housing 4 includes the locking assembly 45 to lock the spindle 6. With the gear compartment 26 downsized, this structure allows grinding performed in relatively small spaces and improves viewability during operation.

The joint 25 has the lateral outlets 27 on the right and the left of the compartment 26 and across the compartment 26.

The lateral outlets 27 located in a well-balanced manner increase the opening area and improve cooling efficiency.

The joint 25 has, in the portions of the front surface, the upper outlets 28 (second outlet) above the gear compartment 26 and the lower outlets 29 (second outlet) below the gear compartment 26.

These upper and lower outlets 28 and 29 can increase the opening area together with the lateral outlets 27.

The spindle 6 has the axis A2 extending in the vertical direction. The locking assembly 45 is between the axis A2 of the spindle 6 and the joint 25.

This structure can reduce the height of the upper end of the gear compartment 26 and can improve viewability although the locking assembly 45 is located at the middle in the lateral direction of the gear housing 4.

The motor 15 includes the output shaft 16 extending in the front-rear direction. The distance D1 in the vertical direction from the axis A1 of the output shaft 16 to the upper end of the gear compartment 26 is less than or equal to half the distance D2 in the vertical direction from the axis A1 of the output shaft 16 to the upper end of the joint 25.

This structure can further reduce the height of the upper end of the gear compartment 26 and can further improve viewability.

The gear compartment 26 and the joint 25 are integral as a single component.

This simplifies the structure to include fewer components.

The gear compartment 26 is formed from metal, and has the surface covered with the front cover 31 (resin).

This structure prevents an operator from directly touching the gear compartment 26 with hands, while maintaining the rigidity of the gear compartment 26. This improves the operability of the locking assembly 45.

The threaded holes 12 (an example of the mount) for the side handle 13 are located rearward from the gear housing 4.

This structure can eliminate the threaded holes in the gear compartment 26 and can thus further downsize the gear compartment 26. The side handle 13 located rearward from the gear compartment 26 allows an easy operation without being restricted by the position of the side handle 13, thus improving workability in small spaces.

Modifications of the present disclosure will now be described.

A compartment may be located differently from the compartment in the present embodiment that is located at the middle in the vertical and lateral directions relative to the joint. The compartment may be slightly off the middle in the lateral or vertical direction when the joint has the outlets in at least a right portion or a left portion of the front surface. The shape of the compartment is not limited to the shape in the present embodiment. The compartment may be elongated semicircular or semielliptic as viewed in plan or semicircular as viewed from the front.

The numbers or the shapes of the outlets in the joint are not limited to the numbers or the shapes in the present embodiment. For example, all the outlets may be arc-shaped, elongated circular, circular, or rectangular, or may be shaped with a combination of these.

The lateral outlets may be different from the lateral outlets in the present embodiment that are laterally symmetrical to one another depending on the position and the shape of the compartment. The lateral outlets may be located at least either on the right or left of the compartment.

The upper outlets or the lower outlets, or both may be eliminated.

The distance from the axis of the output shaft to the upper end of the compartment may be half the distance from the axis of the output shaft to the upper end of the joint. With appropriate viewability, these distances may not be defined.

The locking assembly may be at a position other than between the axis of the spindle and the joint. With the outlets in either the right or left portion, the locking assembly may be located, for example, laterally outward from or frontward from the axis of the spindle.

The head housing may not include the joint and the gear compartment that are integral with each other as the gear housing in the present embodiment. The joint and the gear compartment may be connected to each other after being formed separately.

The resin covering the compartment may be formed differently from the front cover in the present embodiment. For example, the resin may be integral with the surface of the compartment by, for example, insert molding. The resin may be eliminated.

The mounts for the side handle are not limited to the threaded holes. The mounts may be located on the side surfaces of the compartment when the compartment is downsized.

The locking assembly may have a structure different from the structure described in the present embodiment. The locking member may include, for example, three or more engagement pins other than the two engagement pins.

The engagement pins may not be located separately in the right and left portions of the head housing. The connector may have its middle protruding upward to be pressed by an operable member.

The engagement pins may be rods shorter than those in the present embodiment. The engagement pins may each have any cross section other than the circular cross section. The engagement pins may not have the sloped lower ends, as appropriate for the shape of the outer surface of the gear. The engagement pins may each be integral with the connector rather than being separate from the connector.

Multiple coil springs may be used. An elastic member other than the coil spring may be used.

The operation button may also have a structure different from the structure of the present embodiment. For example, the operation button may include a circular button as viewed in plan or the supporting rod located frontward, rightward, or leftward from the button. The operation button may move vertically rather than swinging about the supporting rod. The operation button may be eliminated. An operable member may be formed integrally with the upper surface of the locking member to be directly operable.

The locking assembly may have a structure different from the structure of the present embodiment. The locking assembly may have a known structure in which a single engagement pin is urged against the bevel gear to be engaged with the bevel gear and locks the rotation of the spindle.

The grinder may be a direct current (DC) tool powered by a battery pack, rather than an alternating current (AC) tool powered by utility power.

The main housing of the grinder is not limited to the structure of the present embodiment including the outer housing and inner housing. For example, the main housing may include the outer housing alone.

The power tool according to the present embodiment is not limited to the grinder. For example, the structure of the head housing in the present embodiment is applicable to other grinding tools such as a polisher and a sander.

REFERENCE SIGNS LIST

1 grinder
2 outer housing
3 inner housing
4 gear housing
5 bearing retainer
6 spindle
10 inlet
11 handle mount
12 threaded hole
13 side handle
15 motor
16 output shaft
21 fan
25 joint
26 gear compartment
27 lateral outlet
28 upper outlet
29 lower outlet
30 first bevel gear
31 front cover
34 second bevel gear
36 recess
37 threaded portion
38 inner flange
39 outer flange
40 tip tool
45 locking assembly
46 locking member
47 coil spring
48 operation button
A1 axis of output shaft
A2 axis of spindle
D1 distance in vertical direction from axis of output shaft to upper end of front cover
D2 distance in vertical direction from axis of output shaft to upper end of joint

What is claimed is:

1. A power tool, comprising:
a motor;
a fan configured to cool the motor;
a main housing accommodating the motor and the fan;
a spindle to which a tip tool is detachably attachable;
a locking assembly configured to lock rotation of the spindle; and
a head housing including
a joint connected to a front of the main housing, and
a compartment accommodating the spindle and the locking assembly, the compartment being laterally less wide than the joint,
wherein the locking assembly is located at a middle in a lateral direction of the head housing, and
the joint has, in a portion of a front surface of the joint, a first outlet at least on a right or a left of the compartment to discharge air for cooling the motor generated from rotation of the fan, the first outlet penetrating the joint in a front-rear direction.

2. The power tool according to claim 1, wherein
the joint has first outlets on the right and the left of the compartment and across the compartment.

3. The power tool according to claim 1, wherein
the joint has, in a portion of the front surface, a second outlet at least above or below the compartment, the second outlet penetrating the joint in the front-rear direction.

4. The power tool according to claim 1, wherein
the spindle has an axis extending in a vertical direction, and
the locking assembly is between the axis of the spindle and the joint.

5. The power tool according to claim 4, wherein
the motor includes an output shaft extending in a front-rear direction, and
a distance in the vertical direction from an axis of the output shaft to an upper end of the compartment is less than or equal to half a distance in the vertical direction from the axis of the output shaft to an upper end of the joint.

6. The power tool according to claim 1, wherein
the compartment and the joint are integral as a single component.

7. The power tool according to claim 1, wherein
the compartment comprises metal, and has a surface covered with resin.

8. The power tool according to claim 1, further comprising:
a mount for a side handle, the mount being located rearward from the head housing.

9. The power tool according to claim 2, wherein
the spindle has an axis extending in a vertical direction, and
the locking assembly is between the axis of the spindle and the joint.

10. The power tool according to claim 3, wherein
the spindle has an axis extending in a vertical direction, and
the locking assembly is between the axis of the spindle and the joint.

11. The power tool according to claim 2, wherein
the compartment and the joint are integral as a single component.

12. The power tool according to claim 3, wherein
the compartment and the joint are integral as a single component.

13. The power tool according to claim 4, wherein
the compartment and the joint are integral as a single component.

14. The power tool according to claim 5, wherein
the compartment and the joint are integral as a single component.

15. The power tool according to claim 2, wherein
the compartment comprises metal, and has a surface covered with resin.

16. The power tool according to claim 3, wherein
the compartment comprises metal, and has a surface covered with resin.

17. The power tool according to claim 4, wherein
the compartment comprises metal, and has a surface covered with resin.

18. The power tool according to claim 5, wherein the compartment comprises metal, and has a surface covered with resin.

19. The power tool according to claim 6, wherein the compartment comprises metal, and has a surface covered with resin.

20. The power tool according to claim 2, wherein the joint has, in a portion of the front surface, a second outlet at least above or below the compartment, the second outlet penetrating the joint in the front-rear direction.

* * * * *